INVENTOR
WILLIAM J. CURTIN
BY Le Blanc & Shur
ATTORNEYS

May 27, 1969 W. J. CURTIN 3,446,919

TELEPHONE ANSWERING SYSTEM PROVIDING MULTIPLE ANSWERING POINTS WITH CENTRALIZED OR DECENTRALIZED OPERATION

Filed Sept. 3, 1965

BY Le Blanc & Shur

ATTORNEYS

INVENTOR
WILLIAM J. CURTIN

BY *LeBlanc & Shur*

ATTORNEYS

United States Patent Office 3,446,919

Patented May 27, 1969

3,446,919

TELEPHONE ANSWERING SYSTEM PROVIDING MULTIPLE ANSWERING POINTS WITH CENTRALIZED OR DECENTRALIZED OPERATION

William J. Curtin, 25 W. Main St., Madison, Wis. 53703

Filed Sept. 3, 1965, Ser. No. 485,012
Int. Cl. H04m 3/60
U.S. Cl. 179—27 11 Claims

ABSTRACT OF THE DISCLOSURE

There is disclosed herein an answering service system adapted for operation by a plurality of remotely located associated answering service proprietors. The system permits both decentralized operation under normal conditions with centralized operation for periods of low activity. Thus, each proprietor, e.g., in a separate portion of the city, may operate independently for serving an individual group of answering service customers or, alternatively, an individual proprietor may service the entire clientele of all proprietors during holiday or night hours.

Figure 1:
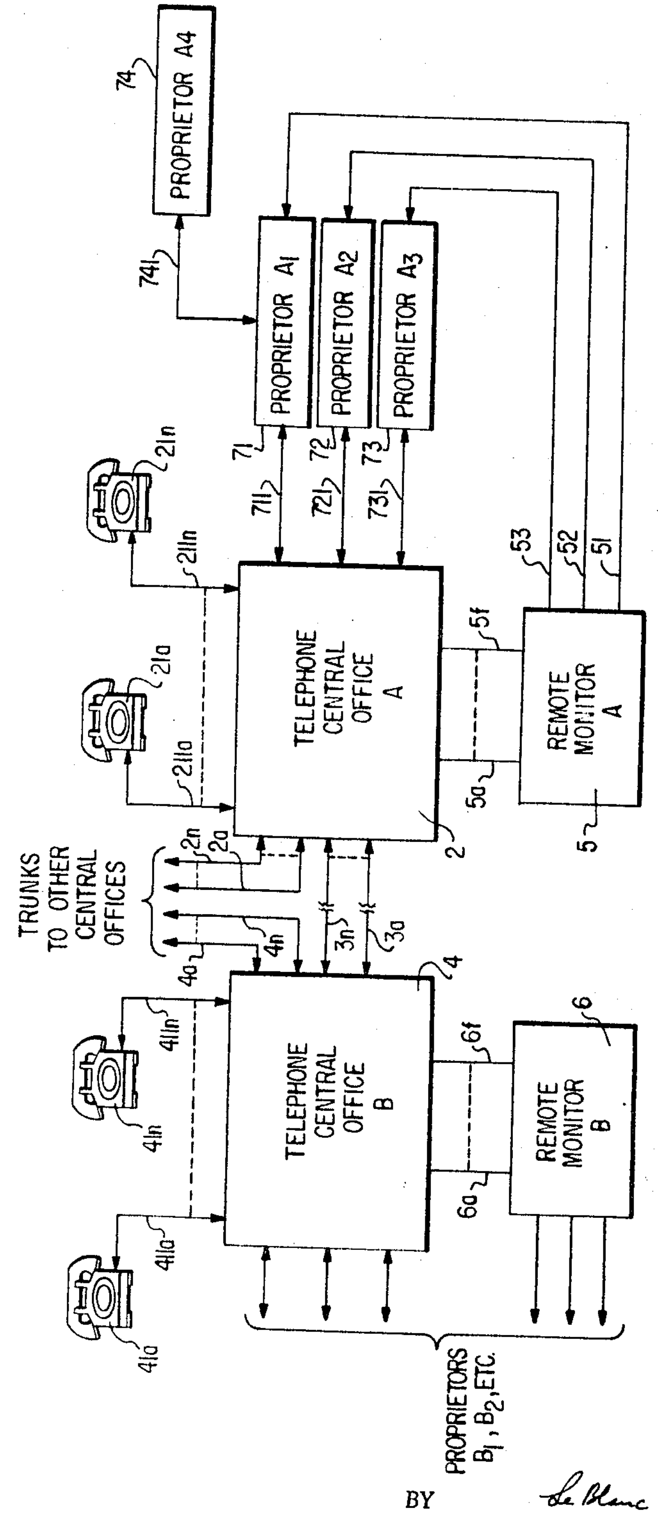

The present invention relates to a telephone answering system and more particularly to an improved telephone answering apparatus for use by an answering service or bureau whereby a sufficient number of answering secretaries may be employed to handle periods of large numbers of incoming cals, while maintaining flexible, personalized and inexpensive service for the answering service client, through low installation and operation cost.

So-called telephone answering services are arrangements which provide means by which individuals, such as doctors or others whose activities and businesses include substantial amounts of local travel, while at the same time involving the receipt of large numbers of telephone calls, may be provided with a telephone answering secretary twenty-four hours a day, without the need of employing an individual on a full time basis for this purpose.

Following World War II, the telephone answering service industry enjoyed a very rapid growth, in part resulting from the great increase in the number of business transactions conducted by telephone, and in part, by the increase in the number of telephones in use. During the early period of the industry's growth, it comprised many small concerns, each serving a small number of clients all located within the area of a single telephone central office.

Limitation of an answering service clientele to one central office area (and in fact, location of the answering service office within close proximity, usually one quarter of a mile or less, to the telephone central office) was necessary in order that the cost to the telephone answering service client could be maintained at a reasonable level. This was due to the fact that the provision of a connection between the answering service office and the telephone line of the client required a talking circuit extending from the telephone central office serving the client to the location of the answering service office. The cost of extending such a circuit is based on the length of the circuit. Therefore in order to obtain a minimum charge for the circuit (which was, of course reflected in the overhead of the answering service and in the charge to the client) the answering service was limited both in scope of available clients, as well as in choice of location.

Accordingly, increasing the clientele of an answering service into the area of another telephone central office, first required the successful establishment of a business in one part of the city, and then the opening of a separate branch office in another part of the city (served by a different telephone exchange) and the hiring of another separate staff for the branch office.

In response to the demand for a more economical and convenient method of expanding into other telephone, exchange areas, various systems, (for example, that shown in U.S. Patent No. 2,685,614, entitled, Telephone Answering System) have been developed, and are successfully in use throughout the industry. Briefly, systems such as that of the above-mentioned patent provide for a centralized answering service wherein monitoring means are located in each telephone exchange area to periodically scan the telephone lines for each answering service client in that area, and to transmit an indication to an answering service office located in a different part of the city when any of the answering service clients in the remote telephone exchange area required service. A suitable talking and signalling circuit connects the telephone answering service office and the remote monitoring office to permit both the indication of a service requirement, as well as to permit the answering office to selectively establish a communication path to the remote monitoring office through which incoming calls for a client in the remote telephone exchange area may be answered.

Operation of the remote monitoring office of the patented system does not require the presence of an operator. Indeed, the cost of the establishment and operation of the remote monitoring office involves only the extension of a talking circuit between the appropriate central office and the nearby monitoring office for each subscriber within that central office area (as would be required in the case of a branch office of the answering service in that exchange area), plus the establishment of a single communication circuit between the remote monitoring office and the central answering service office itself to allow signalling and communication therebetween. Accordingly, expansion of a telephone answering service by that system requires only the small investment for the remote monitoring unit and the single communication circuit to the main office of the answering service, therebp enhancing greatly the opportunity for the answering service proprietor to expand throughout an entire city.

As a result of such development, the expansion of the telephone answering service industry was in fact greatly accelerated, to the extent that presently, a typical answering service has many clients located in all parts of a city, and in fact, can often adequately serve the needs of quite a large area.

However, as a result of the increased size of each individual answering service, there exist a number of serious problems which threaten the continued success of this industry. For example, the most immediate result of large scale expansion, is that the business becomes to large to be successfully handled by a single person, whereupon it becomes necessary to hire assistants at the answering service main office, often on a twenty-four hour basis, thereby materially increasing the cost of operation. In addition, as might be expected, the number of calls which must be answered is not uniformly distributed throughout the twenty-four hour day, but rather is characterized by periods of intense activity separated by periods of low or even non-existent activity. For a very large answering service, the necessity of providing a large staff during periods of peak activity imposes a large economic burden since it is generally not possible to employ persons only during the short periods of time during which peak activity occurs. Finally, by no means an insignificant factor in the growth of the answering service industry, has been the ability of the answering service proprietor, through direct contact with the client, to provide substantially the same sort of personalized service that would be available to the client had he hired an individual expressly for the purpose of answering his telephone. As the number of clients of an answering service grows, it becomes difficult, if not impossible to provide this personal service, thereby diminishing one of the more attractive features previously available to the client.

A number of attempts have been to overcome the loss of the personal character of the modern answering service or to offer partial substitutes therefore. For example, special equipment has been devised to count the number of rings of a subscriber's phone, allowing the subscriber if he so desires, to answer his own phone within a certain number of rings, before the answering service is notified of the incoming call. Other techniques have also been proposed for distributing incoming calls to all of the answering service employees uniformly during the peak service hours. However, the cost of providing such improved services far outweighed the improvement afforded. In fact, it has generally been the conclusion of those in the industry that the only economical solution to the problem of fluctuating service demands would be to employ a staff whose number varied in response to such fluctuations. However, realistically speaking, this solution is not practical. Indeed, the only apparent solution to the problem of personal service appeared to be to decrease the number of subscribers which are served directly by each answering secretary.

According to the present invention, these difficulties are minimized or eliminated by replacement of the manned answering service central office in the area of a telephone company exchange, by a remote automatic switching and monitoring center associated with the telephone central office which automatically provides indications of service demands to each of a number of decentralized answering locations, which, for example may be located in the homes or business establishments of a number of independent associated answering service proprietors. In addition, the present invention includes means connecting the establishment of each proprietor to the nearby central office to provide a talking circuit for answering calls for any answering service client served by that particular telephone exchange.

With an answering system such as described above, it is possible, for example, for a number of independent, associated telephone answering service proprietors to individually solicit and serve a number of clients, and by the use of the common equipment of the present invention, be united into a single system whereby, during periods of peak activity each of the proprietors working concurrently will provide adequate coverage for his own clientele, yet during periods of low demands, one or more of the associated proprietors may serve, on a rotational basis, the needs of the combined clientele of all. In effect, the present invention provides a means by which a number of independent proprietors, each of whom obtains as many subscribers as he feels he can handle during his most intense period of activity, may be freed of the necessity of hiring assistants during periods of decreased activity, by serving as a relief for his associates in return for similar relief on a rotational basis.

It is accordingly an object of the present invention to provide a telephone answering system for use by a telephone answering service which will overcome the difficulty of fluctuation in service demands, while at the same time providing personalized service for a moderately large clientele.

It is a further object of the present invention to provide a telephone answering system which is neither expensive nor complex, and which will allow adequate coverage by a telephone answering service of its clients during periods of peak activity, yet will not be economically prohibitive during periods of small or nearly no service demands.

It is a further object of the present invention to provide a telephone answering system for use by a telephone answering service characterized by little or no necessity to hire assistants during even the most intense periods of calling activity.

It is a further object of the present invention to provide a telephone answering system for a moderately large telephone answering service in which the answering secretaries may be decentralized if it is desired, yet may, if desired, serve subscribers located outside the telephone exchange area in which the answering service is located, and yet may be operated economically and efficiently both during periods of intense and decreased activity. Alternatively, it is an object of this invention to provide a telephone answering system whereby a number of independent telephone answering services, each primarily serving its own clients, may be associated into a common answering service network to provide efficient and inexpensive coverage of the combined clientele both during periods of high answering service demands and during periods of decrease, or extremely low demands.

It s a further object of this invention to provide a telephone answering system for use by a telephone answering service which will permit a high degree of personal contact with the answering service subscriber. It is a related object of the present invention to provide a telephone answering system which will permit personal service for answering service subscribers combined with efficient utilization of personnel during periods of fluctuating answering service activity.

Figure 2:
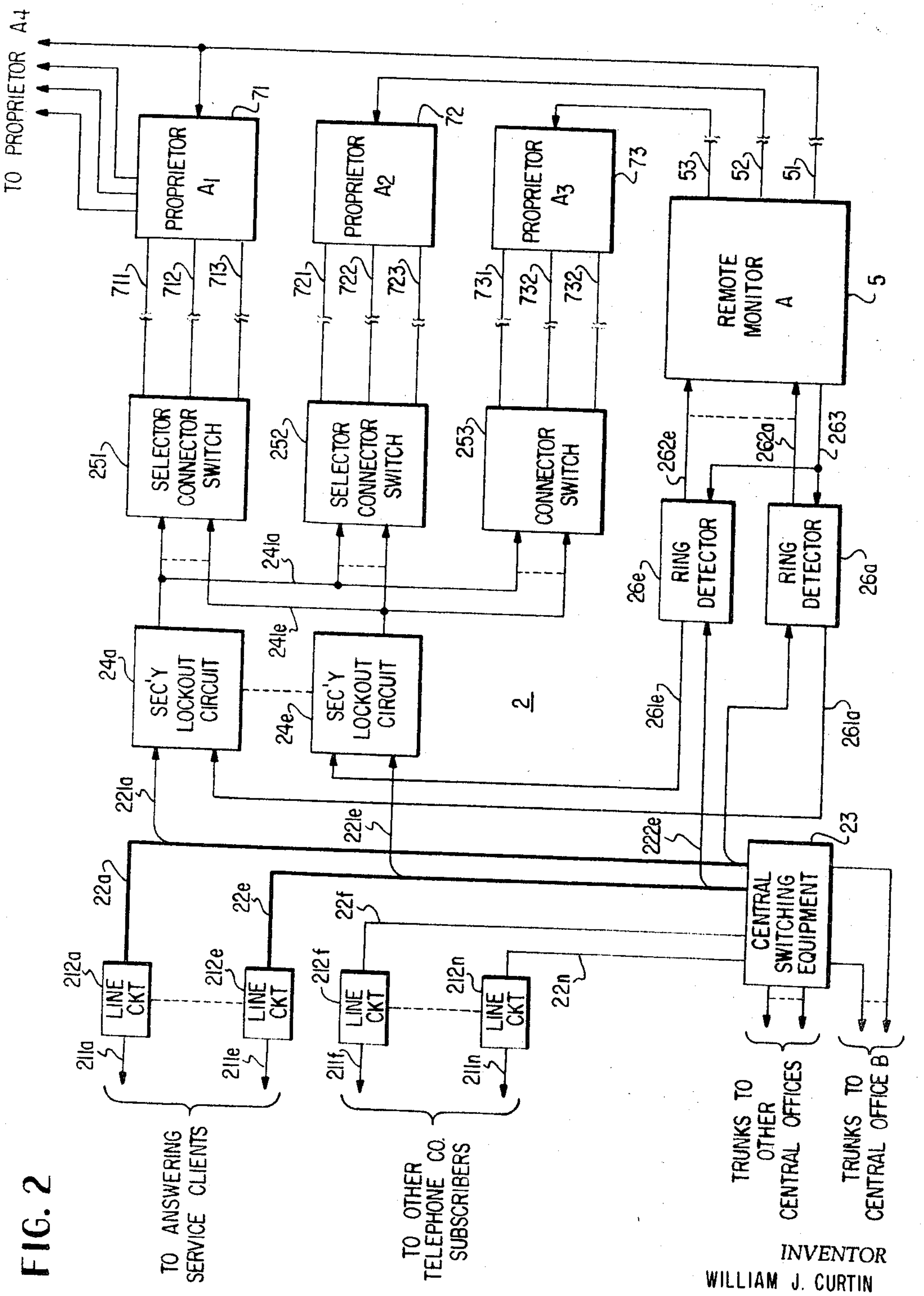
Figure 3:
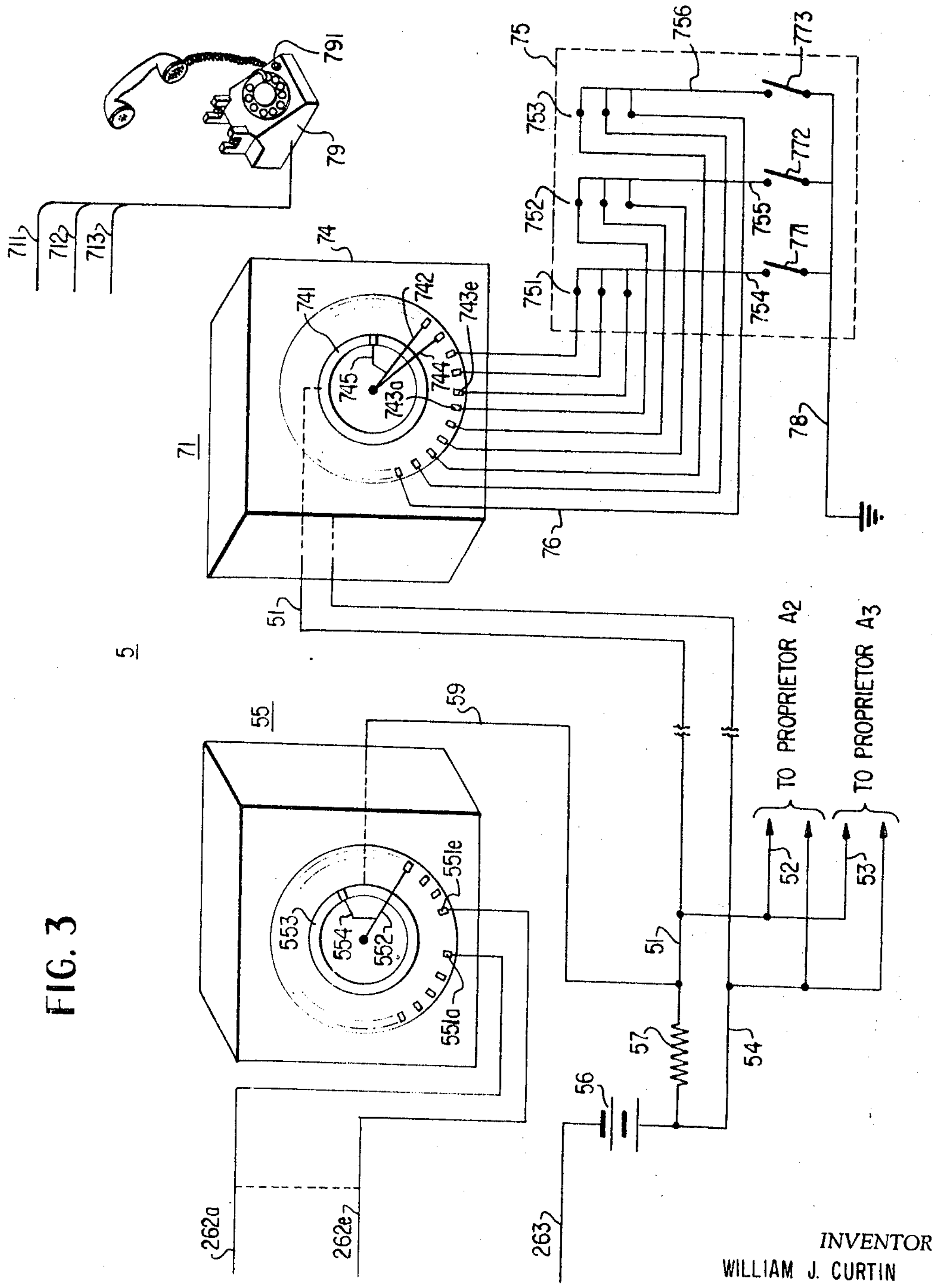

These and further objects and advantages of the invention will be readily apparent from consideration of the following specification and claims and appended drawings, wherein:

FIGURE 1 is a general block diagram of the overall configuration contemplated by the present invention;

FIGURE 2 is a somewhat more detailed block diagram of a portion of FIGURE 1 showing the details of the central office equipment, and interconnections between the central office and the establishments of each of the associated proprietors; and FIGURE 3 is a detailed block diagram of another portion of FIGURE 1 showing the nature of one suitable embodiment of the equipment at the automatic monitoring station and at the establishment of each of the associated proprietors.

FIGURE 1 shows a block diagram of the overall configuration of part of the telephone system of a city including the telephone answering system of the present invention. The system may include a number of central offices such as telephone central offices A and B, shown at 2 and 4, respectively, of any well known type. Central offices A and B interconnected by means of a number of suitable trunk lines 3*a*–3*n*. Each of the central offices 2 and 4 are provided with a further number of trunk lines 2*a* through 2*n* and 4*a* through 4*n*, respectively, to the remaining central offices which comprise the city telephone system.

Telephone central office 2 may serve a number of subscribers 21*a*–21*n* which are interconnected therewith by means of a series of two-way circuits 211*a*–211*n* respectively. Similarly, telephone central office 4 may serve a number of subscribers 41*a*–41*n* connected therewith by means of two-way circuits 411*a*–411*n* respectively. The area served by each central office may include one or more remote telephone answering service monitors such as remote monitors A and B shown at 5 and 6 respectively in FIGURE 1, which monitors may be located within the appropriate central office or at some other nearby location. Remote monitors 5 and 6 are connected with central offices 2 and 4 respectively by means of a number of circuits 5*a*–5*f* and 6*a*–6*f*. If not within the central office, monitor 5 and 6 are most advantageously located within the minimum mileage distance from the associated central office to provide minimum cost for the extension of telephone lines thereto. Each remote monitor such as 5, simultaneously serves a number of telephone answering proprietors such as proprietors A1, A2 and A3, shown at 71, 72 and 73, respectively in FIGURE 1. In addition, each of the proprietors directly connected to the remote monitor may be connected in parallel to another proprietor such as proprietor A4 shown at 74 in FIGURE 1. Proprietors 71, 72 and 73, are connected to the remote monitor 5 by means of signalling circuits 51, 52 and 53, respectively, and are connected to the telephone central office associated therewith by means of two-way circuits 711, 721 and 731, respectively.

In a like manner, remote monitor 6 may be associated with a number of telephone answering proprietors B1, B2, . . . located in the area of central office B as also indicated in FIGURE 1.

Referring now to FIGURE 2, there is shown in a detailed block diagram that portion of the telephone answering system of the present invention which may be located in, and comprise a part of a central office (such as the central office 2 of FIGURE 1). This figure also shows the relationship between the central office equipment, the remote monitoring equipment 5, and the answering service proprietors 71, 72 and 73. Central office 2 is connected in a well known fashion to the homes, offices, etc. of telephone company subscribers **21*a*–21*n* by means of suitable two-way lines 211*a*–211*n* as shown in FIGURE 2. Shown also in schematic form, is a portion of the standard central office equipment, namely line circuits 212*a*–212*n*, and central office switching equipment 23 connected to the line circuits by means of suitable cables 22*a*–22*n*. For purposes of this discussion, it may be assumed that telephone company subscribers 21*a*–21*e* are clients of the answering service using the equipment shown in the figure, while telephone subscribers 21*f*–21*n*** are not clients of the answering service.

With particular regard now for answering service subscribers **21*a*–21*e*, it may be understood that the multiple wire cables 22*a*–22*e* include a talking circuit and a suitable ringer circuit to effect both communication and signalling between the central switching equipment 23** and any one of the subscribers. These circuits, as well as the remainder of the previously described equipment are typical of the circuits and equipment found in the normal telephone exchange, the details of which form no part of the present invention.

In order to establish suitable signalling and communication connections between proprietors 71–73 and the lines of the answering service clients **21*a*–21*e*, suitable connections may be made to the multiple wire cables 22*a*–22*e*. In particular, for each of the answering service subscribers, each of the talking circuits included within cables 22*a*–22*e* is tapped by means of an appropriate connection to one of circuits 221*a*–221*e*, while the ringer circuits within cables 22*a*–22*e*, are tapped by means of suitable connections to one of circuits 222*a*–222*e*. By means of the equipment to be described, the communication circuits 221*a*–221*e* may be selectively connected to one or more of the proprietor stations 71 through 73 which comprise the answering service. In addition, further equipment to be described serves to scan each of the ringer circuits 222*a*–222*e* to transmit to one or more of the proprietor stations 71–73** an indication of an incoming call on the line of one of the answering service subscribers, whereby the call may be answered.

As previously mentioned, one of the desirable features of this invention is the provision of a system wherein a number of decentralized remotely located individual or joint proprietors may be combined into a system characterized by a large number of answering service secretaries during periods of peak service demand, while still providing efficient and economical operation during those periods during which service demands are typically low. To this end, it may be assumed that the proprietors of equipment 71–73 operate a joint or independent cooperative venture wherein each of proprietors A1, A2 and A3, is primarily responsible for providing telephone answering service to a number of the subscribers **21*a*–21*e*, but, because of the unique nature of the answering system of the present invention, are in fact each able to provide answering service for all of the subscribers 21*a*–21*e***.

Accordingly, each of the communication circuits **221*a*–221*e* is connected through a separate secretarial lockout circuit 24*a*–24*e*, which may comprise a relay having normally open contacts, or a suitable semi-conductor switch having a normally blocking condition. The outputs of lockout circuits 24*a*–24*e* are provided over a number of common lines 241*a*–241*e* to a plurality of selector-connector switches 251–253 equal in number to the number of proprietors which comprise the answering service. Switches 251–253** may comprise a suitable multiple level rotary stepping switch or a suitably designed switching matrix.

Signalling circuits **22*a*–22*e* are provided to a number of ring detectors 26*a*–26*e* which function to sense the presence of a ringing signal in each subscriber's circuit (i.e. the presence of an incoming call for that particular subscriber). Ring detectors 26*a*–26*e* may comprise relay circuits or suitable electronic switching devices such as transistor switches. Upon the detection of a ringing signal by circuits 26*a*–26*e*, a signal is provided over leads 261*a* through 261*e* to the associated secretary lock-out circuit 24*a*–24*e* whereupon the lock-out function is disabled and the appropriate one of communication circuits 221*a*–221*e* is connected to one of the common circuits 241*a*–241*e***.

Further responsive to the indication of a ringing signal on any of leads **261*a*–261*e*, ring detector circuits 26*a*–26*e* selectively connect the signal appearing on common line 263 to appropriate ones of leads 262*a*–262*e*, whereby signals generated by remote monitor 5 and transmitted in common to all of the ring detectors 26*a*–26*e* selectively return to the remote monitor by means of the leads 262*a*–262*e***.

The presence of a signal on one of leads **262*a*–262*e* is detected by suitable periodic scanning means provided at remote monitor 5, an indication of which is transmitted in common over leads 51 through 53 to each of proprietor stations 71–73** respectively, as an indication that one of the answering service customers has received an incoming call which must be answered by the answering service.

In order to provide a connection between one of the answering service proprietors A1–A3 and the incoming call on the subscriber's line, suitable selective signalling means, such as a dial telephone, or the like, is provided at each of proprietor stations 71–73 connected to dial-talk circuits 711–712, 721–722, and 731–732, which interconnect the proprietor stations 71–73 with selector-connector switches 215–253 respectively.

As indicated, connector switches 251–253, may be any one of a number of commonly known electronic or electro-mechanical selective switching systems such as multiple position rotary switches, cross bar switches, solid state switching matrices, or the like. Switches 251–253 are appropriately connected in parallel to all of the line circuits **212*a*–212*e* by means of common circuits 241*a*–241*e*, lock-out circuits 24*a*–24*e*, and leads 221*a*–221*e***.

Each proprietor station 71–73 is further connected to one of the switches 251–253 by means of one of hold circuits 713, 723 and 733, respectively. As is well known in the art, the hold circuits are connected to the signalling instrument at each proprietor station to effect the establishment of a shunt across the one of circuits **241*a*–241*e*, then connected through the appropriate switch 251–253** to the proprietor's dial-talk pair whereby an incoming call on that line will not be lost if it is necessary to concurrently answer another call.

In FIGURE 3 is shown a simplified diagram of a suitable scanner located in monitor 5, for sensing the presence of ringing signals on lines **262*a*–262*e*, and a similarly simplified diagram of receiving equipment such as may be located at one of the proprietor stations 71–73 (e.g. proprietor station 71**).

Monitor 5 may include a rotary scanner 55 having a number of commutator bars 551*a* through 551*e*, connected rotating brushes 552 and 554 driven at a constant speed by a suitable synchronous motor (not shown) and a conductive ring 553 in permanent contact with brush 554.

Remote monitor 5 further includes a suitable power source such as battery 56 connected at its negative terminal to lead 263 for transmission to the telephone central office 2 and connection to ring detecting circuits 26*a*–26*e*. The positive side of battery 56 is connected through the resistor 57 and lead 59 to conducting ring 553 of rotary scanner 55 and through common circuit 54 to each of the proprietor stations 71–73. Lines 51, 52, and 53 are also connected to the conducting ring 553 over lead 59. Thus, it is seen that the signalling circuit to each of proprietor stations 71–73 may comprise a two-wire line such as 51–54 shown connected to proprietor station 71.

As is readily apparent from FIGURES 2 and 3, the presence of an incoming call will cause a circuit to be completed from battery 56, through lead 263, one of ring detectors 26*a*–26*e*, and the corresponding one of leads 262*a*–262*e*, thereby effecting the appearance of the negative battery voltage on the appropriate one of commutator bars 551*a*–551*e*. This voltage will be sensed by the rotary brush 552 as it passes over the commutator bars, and transmitted through brush 554 and conductive ring 553 to one side of resistor 57, whereupon the battery voltage appearing thereacross will be transmitted to proprietor stations 71–73.

Proprietor station 71 includes a synchronized receiver 74, which may be operated by a synchronous motor (not shown) or, may be synchronized with rotary scanner 55 in any other way well known in the art. Receiver 74 includes a suitable conductive ring 741, directly connected to incoming lead 51, connected rotating brushes 742 and 745, shorting brush 744, and a plurality of stationary contacts 743*a*–743*e*, equal in number to the total number of clients of the three associated proprietors A1 through A3. Each of the stationary contacts 743*a* through 743*e* is connected through one of leads 76 to an indicator panel 75 whereby the recipient of the incoming call may be identified by the proprietor. Brush 744 is electrically isolated from brushes 742 and 745, but is physically connected thereto so as to be driven by the same motor.

Indicator panel 75 may include a number of groups of indicator lights 751–753, each group comprising indicators for those clients which are the primary responsibility of one of the proprietors. Each of the groups of indicators 751–753 are connected through separate lines 754–756, suitable two position switches 771–773 respectively, and common return lead 78 to ground.

The indicator lights on panel 76 may advantageously be neon bulbs or the like, having a holding voltage somewhat less than the firing voltages. The indicator lights may be biased to a voltage slightly in excess of their holding voltage, whereby, the presence of a signal on lead 51 during the time that brush 742 passes over a particular one of contacts 743*a*–743*e* will cause the appropriate indicator lamp to be lighted. Immediately prior to the contact of any one of stationary contacts 743*a*–743*e*, a suitable shorting brush 744 passes thereover, causing the associated indicator lamp to be connected to ground potential. Thus, it may be seen that each of the indicator lamps associated with a client having an incoming call will blink on and off during each revolution of rotary scanners 55 and 74, thereby serving as an indication of a service demand.

As previously discussed, each of the proprietor stations includes a dial telephone 79 of standard configuration having a hold button 791, whereby each proprietor is afforded access through one of lines 711, 712, and 713, to a selector-connector switch such as 251 at the central office.

Of course, it should be recognized that the electromechanical scanning arrangement shown and described herein, may be readily replaced by any other suitable scanning switch such as synchronized digital counters as will be readily apparent to those skilled in the art.

Referring now to the operation, assume the presence of an incoming call for answering service client 21*a*. Central switching equipment 23 will connect the incoming call to the communication circuit in cable 22*a* and will establish a suitable ringer signal on the signalling path therein. The ringer signal will be transmitted over line 222*a* to the associated ring detector 26*a* which, in turn, will return a suitable signal over the lead 261*a* to close a circuit through the lock-out means 24*a* to connect lead 221*a* to common circuit 241*a*.

In addition, as previously indicated, the negative voltage from battery 56 at remote monitor circuit 5 is transmitted over common circuit 263 to each of the ring detectors, so that upon activation of ring detector 26*a* by the signal on lead 261*a*, negative battery is returned to remote monitor 5 over signalling circuit 262*a*, and appears on commutator bar 551*a*.

As rotating brush 552 passes over commutator bar 551*a*, the negative battery voltage is sensed, and is transmitted through arm 554, conductive ring 553, and lead 59 to the common connection between leads 51, 52, and 53. Therefore, it is seen that battery 56 is placed across resistor 57, and that battery voltage is transmitted over lead 54, and leads 51–53 to each of proprietor stations 71–73.

Rotary scanners 55 and 74 are synchronized in any suitable manner so that rotating brush 552 rests on contact 551*a* concurrently with the resting of brush 742 on contact 743*a*, whereby negative battery voltage is placed on contact 743*a* through lead 51, conductive ring 741, wiper arm 745, and brush 742, and, in similar fashion on corresponding contacts in scanners located at proprietor stations 72 and 73.

Assume now that subscriber 21*a* is the primary responsibility of proprietor A1, and that the time at which the incoming call is received is typically a period of peak service demands on the answering service. At such a time, all of the associated proprietors A1, A2, and A3 are working, and therefore, the incoming call will be handled by the proprietor at station 71. In order to avoid the distraction of incoming calls intended for proprietors A2 and A3, proprietor A1 may open switches 771 and 773, and close switch 772 as shown, permitting an indication of only those clients who are primarily the responsibility of proprietor A1.

Upon receipt of the service request, as indicated by a blinking light on indicator panel 75, proprietor A1 will dial the multiple digit code corresponding to the client for whom the call is intended on signalling instrument 79. The code will be transmitted in well known fashion over dial-talk pair 711–712 to the selector-connector switch 251. Upon receipt of the dialed code, switch 251 will establish suitable connections therethrough to complete a circuit between dial-talk pair 711–712, common circuit 741*a*, secretarial lock-out circuit 24*a* (which has been activated by receipt of a signal over lead 261*a* from ring detector 26*a*), circuit 221*a*, and the communication circuit in cable 22*a*, allowing proprietor A1 to answer the call.

If, during the time that a call for line 21*a* is being answered, a second call arrives for another one of the clients of proprietor A1, hold circuit 713 may be activated by depression of hold button 791 to place the call on line 21*a* in a temporary hold while the new incoming call is answered. When it is desired by proprietor A1 to return to the waiting call on line 21*a*, it is only necessary that the appropriate code for line 21*a* be redialed whereupon a connection thereto is re-established.

Concurrently with the receipt of calls for which primary responsibility rests with proprietor A1, calls may be received for proprietors A2 or A3. For such calls, the presence of a ringing signal is detected as before, suitable connections are made through one of secretarial lock-out circuits, and service demands are transmitted over lines 262 to remote monitor 5 as previously described, and upon sensing by the remote monitor 5 of the presence of such calls, signals are simultaneously transmitted over lead 54 and leads 51 through 53 to proprietor stations 71 through 73.

Proprietors 72 and 73 will appropriately position switches corresponding to switches 771–773, to prevent an indication of calls for other proprietors, and thus, during periods of peak demands will only be required to answer calls for a portion of the total clientele (in the present example, ⅓), allowing a high degree of personal service for the clients.

It should be recognized that the number of clients is limited both by the capacity of switches 251–253, as well as by the number of clients for whom personal service can reasonably be afforded. The former presents little difficulty since switches of this type are available having minimum capacity of at least 100 lines. As to the latter limitation, it has been found that during periods of peak demands, a proprietor can adequately handle calls for at least 30 clients without need of assistance. Further, the substantial reduction in overhead afforded to a proprietor using the present system permits profitable operation even with a clientele of this size.

During periods of low service demands, each of the proprietors alone will be able to adequately serve the combined clientele. Thus on a rotational basis, each proprietor can readily serve as a relief for the others with no increase in the cost of operation.

Assuming that proprietor A1 is to answer all incoming calls during a particular period, all of switches 771–773 will be closed (and all corresponding switches at proprietor stations 72 and 73 will be open), whereby proprietor A1 receives an indication of all incoming calls, which may be answered as before by dialing the appropriate code on instrument 79.

Thus it is seen that by the novel arrangement described herein, the difficulties presently attendant to the use of a telephone answering service are overcome in a practical and economical manner. In addition to the arrangement described in detail above, the present invention admits of a wide degree of modification within the scope thereof. For example, as previously mentioned, means exist to count the number of rings before notifying the answering service of the incoming call, whereby the subscriber may himself answer the call if he desires. Such equipment may be readily incorporated into ring detectors **26*a*–26*e* if desired by the client. In the event that such equipment is used, no signals appear on leads 261*a*–261*e* and 262*a*–262*e* until the required number of rings has been sensed. Therefore, if the client himself answers the call before the required number of rings, no signal is sent over leads 51–53 and (because of the blocked condition in secretary lock-out circuits 24*a*–24*e***) the answering service does not have access to the client's line.

If desired by the proprietor, an additional line or lines may be extended from switching equipment 23 to switches 251–253 allowing the proprietor, by dialing the code for the appropriate position on his selector-connector switch to use his dial telephone both to answer calls for his subscribers, and also to make and receive his own calls.

In addition, modification of the apparatus previously noted in Patent No. 2,685,614 to permit connection of the present system to clients served by remote telephone exchanges may be readily accomplished, however, the number of clients should not exceed the number which may be adequately served by a single proprietor in accordance with the teachings herein.

Obviously many other modifications are possible in light of the above teachings. It is therefore understood that the invention may be practiced otherwise than we described, with the scope of the appended claims.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Telephone answering bureau apparatus for use with a telephone system having a plurality of subscriber lines, a central office, and means in said central office for effecting interconnections between subscriber lines, said answering bureau apparatus comprising: a plurality of answering stations remotely located relative to each other and to said central office; monitoring means repsonsive to an unanswered call on any subscriber line to provide a signal representative of the identity of the called line to each of said answering stations; indicator means at each answering station, coupled to said monitoring means, and including an indiviual indicator for each subscriber line, indicators for certain of said subscriber lines being grouped to denote primary answering responsibility for each of said answering stations; means at each answering station for independently suppressing the operation of each of said indicator groups; and communication and control means at each answering station for selectively establishing a talking path to any of the subscriber lines, independent of grouping or primary answering responsibility.

2. Answering bureau apparatus as defined in claim 1, wherein said monitoring means comprises ringing detector means connected to each subscriber line and operative in response to a ringing signal on said line, means for sequentially testing for the operative condition of said ringing detector means, and further means coupling said testing means to each of said answering stations for transmitting signals for each of said ringing detector means which is in the operative state.

3. Answering bureau apparatus as defined in claim 2 wherein each of said answering stations includes means for connecting said further means and said indicator means to provide a signal representing an operative state for a given one of said ringing detector means to a different one of said indicators, the signal so provided serving to identify a subscriber line having an unanswered call thereon.

4. Answering bureau apparatus as defined in claim 1 further including a plurality of multiple input switching devices, means for connecting each of said subscriber lines in multiple to corresponding inputs of said multiple input switching devices; and means for coupling one of said multiple input switching devices to each of said communication and control means, the latter being operative to establish a talking path from the answering station through said multiple input switching device to a desired one of said inputs.

5. Answering bureau apparatus as defind in claim 4 wherein each of said connecting means is responsive to the presence of an unanswered call on the respective subscriber line to connect said line to the inputs of said multiple input switching device, but is other wise operative to isolate said line from said input.

6. Telephone answering bureau apparatus for use with a telephone system having a plurality of subscriber lines, a central office, and means in said central office for establishing interconnections between subscriber lines, said answering bureau apparatus comprising: a plurality of answering stations remotely located relative to each other and said central office; a plurality of multiple input switching devices; means connecting each of said switching devices with one of said answering stations; a ringing detector coupled to each of said subscriber lines to sense the presence of unanswered incoming calls for said lines; connector means coupled to each of said subscriber lines and responsive to operative of the respective ringing detector to connect the respective subscriber line to an input of each of said multiple input switching devices; ringing detector scanning means for sequentially testing each of said ringing detectors and for providing signals to identify particular lines having unanswered incoming calls thereon; means connecting said ringing detector scanning means to each of said answering stations; indicator means at each answering station including an individual indicator for each of said ringing detectors and the corresponding subscriber line; actuating means at each of said answering stations for providing the identifying signals to those indicators corresponding to subscriber lines having unanswered calls thereon; and means at each answering station for establishing a talking path through the respective one of said multiple input switching devices to a desired subscriber line; thereby permitting any answering station to provide answering service for all of said subscriber lines.

7. Answering bureau apparatus as defined in claim 6 wherein said ringing detector scanning means and said actuating means cooperate to connect each indicator with the respective ringing detector in sequence; and further including means for completing an electrical circuit through each of said indicators, the actuating means and the respective ringing detector; whereby a given actuator will be operated when connected to its respective ringing detector if said ringing detector is operative at that time.

8. Answering bureau apparatus as defined in claim 7 wherein said actuator means comprises a further scanning means synchronously operating with said ringing detector scanning means.

9. Answering bureau apparatus as defined in claim 8 wherein said indicator means each include means for grouping said individual indicators to denote primary answering responsibility for a given answering station, a switch for each group adapted to activate the indicators of that group when the switch is in its closed position, and to inactivate the indicators of that group when the switch is in its open position, each individual indicator being provided with two input terminals, a first of said terminals being connected to said further scanning means, and the second of said terminals of all indicators in a particular group being connected to the switch for that group.

10. Answering bureau apparatus as defined in claim 9 wherein said multiple input switching devices, said ringing detectors, said connector means, and said ringing detector scanning means are located at said control office; said ringing detector being connected to the further scanning means at each answering station by a single signalling channel.

11. Answering bureau apparatus as defined in claim 10 wherein each answering station includes: means connected to the multiple input switching device to cause an existing connection therethrough to a particular subscriber line to be broken and to cause a shunt to be placed across that particular subscriber line, whereby a hold condition may be established on such subscriber line under the control of the answering station.

References Cited

UNITED STATES PATENTS

| | | |
|---|---|---|
| 3,341,664 | 9/1967 | Leonard. |
| 3,341,663 | 9/1967 | Stefano. |
| 2,985,721 | 5/1961 | Gatzert. |
| 2,685,614 | 8/1954 | Curtin. |

WILLIAM C. COOPER, *Primary Examiner.*